(12) United States Patent
Lopez et al.

(10) Patent No.: US 10,005,481 B1
(45) Date of Patent: Jun. 26, 2018

(54) DOLLY FOR FIELD TECHNICIANS

(71) Applicants: Albert Manuel Lopez, Lansing, MI (US); Heather Noel Lopez, Lansing, MI (US)

(72) Inventors: Albert Manuel Lopez, Lansing, MI (US); Heather Noel Lopez, Lansing, MI (US)

( * ) Notice: Subject to any disclaimer, the term of this patent is extended or adjusted under 35 U.S.C. 154(b) by 0 days. days.

(21) Appl. No.: 15/820,778

(22) Filed: Nov. 22, 2017

Related U.S. Application Data

(60) Provisional application No. 62/425,879, filed on Nov. 23, 2016.

(51) Int. Cl.
| | |
|---|---|
| *B62B 1/22* | (2006.01) |
| *B62B 1/00* | (2006.01) |
| *B62B 1/04* | (2006.01) |
| *B62B 5/06* | (2006.01) |

(52) U.S. Cl.
CPC ............ *B62B 1/22* (2013.01); *B62B 1/008* (2013.01); *B62B 1/047* (2013.01); *B62B 5/065* (2013.01); *B62B 2202/48* (2013.01); *B62B 2202/56* (2013.01); *B62B 2205/12* (2013.01)

(58) Field of Classification Search
CPC ........... B62B 1/22; B62B 1/008; B62B 1/047; B62B 5/064; B62B 5/065; B62B 2202/48; B62B 2202/56; B62B 2205/12
USPC ................................. 280/652, 47.27, 47.29
See application file for complete search history.

(56) References Cited

U.S. PATENT DOCUMENTS

| | | | |
|---|---|---|---|
| 3,082,016 A | 3/1963 | Pratt | |
| 3,704,799 A * | 12/1972 | Morris, Jr. | ................ B62B 1/14 |
| | | | 187/232 |
| 4,358,124 A | 11/1982 | Geschwender | |
| 4,826,187 A | 5/1989 | Abbott et al. | |
| 4,886,233 A * | 12/1989 | Bateman | ................ A62C 99/00 |
| | | | 169/91 |
| 4,969,660 A | 11/1990 | Spak | |
| 4,993,727 A | 2/1991 | vom Braucke et al. | |
| 5,161,811 A | 11/1992 | Cheng | |
| 5,312,006 A | 5/1994 | Lag | |
| 5,468,005 A | 11/1995 | Yang | |
| 5,529,322 A | 6/1996 | Barton | |
| 5,803,471 A | 9/1998 | DeMars et al. | |
| 5,941,543 A | 8/1999 | Kazmark | |
| 5,984,327 A | 11/1999 | Hsieh et al. | |
| 6,105,508 A * | 8/2000 | Ryburg | .................... A45C 7/00 |
| | | | 108/42 |

(Continued)

*Primary Examiner* — John D Walters
(74) *Attorney, Agent, or Firm* — Ronald R. Kilponen

(57) ABSTRACT

This device relates to devices that can be used to transport equipment, tools and goods and other items from one location to another. The device can haul equipment such as test or analysis equipment. The device has a pocket and compartment for holding a laptop securely during transport. Affixed to the pocket is a folding first shelf for taking notes or working surface. There is a folding second shelf having telescoping holders for securing equipment. The device has wheels that roll smoothly over uneven surfaces. There are collapsing legs that are used to keep the device stable on uneven surfaces. A collapsing base is used to haul equipment, boxes and other large bulky or heavy items. The device is adjustable in the vertical direction to allow the user to adjust the shelf surfaces to a height that is comfortable.

20 Claims, 18 Drawing Sheets

(56) References Cited

U.S. PATENT DOCUMENTS

| | | |
|---|---|---|
| 6,425,599 B1 | 7/2002 | Tsai |
| 6,471,236 B1 | 10/2002 | Eskridge |
| 6,709,222 B2 | 3/2004 | Inman |
| 6,929,269 B2 | 8/2005 | Oliver |
| 6,971,654 B2 * | 12/2005 | Amsili ............... B62B 1/002 280/47.2 |
| 7,040,635 B1 | 5/2006 | Remole |
| 7,156,204 B2 | 1/2007 | Gross |
| 7,607,680 B2 | 10/2009 | Li |
| 7,946,609 B2 | 5/2011 | Johnson et al. |
| 8,186,931 B2 | 5/2012 | Borntrager et al. |
| 8,360,474 B2 | 1/2013 | Lurie |
| 8,474,835 B1 | 7/2013 | Rossi |
| 9,179,493 B1 * | 11/2015 | Uttley ............... B62B 1/12 |
| 9,277,796 B1 | 3/2016 | Elam |
| 9,302,689 B2 | 4/2016 | Stewart et al. |
| 9,463,819 B2 | 10/2016 | Uttley et al. |
| 2009/0033067 A1 | 2/2009 | Coelho et al. |
| 2009/0221880 A1 | 9/2009 | Soderberg et al. |
| 2010/0010320 A1 | 1/2010 | Perkins et al. |
| 2010/0187062 A1 | 7/2010 | Sweeney et al. |
| 2010/0253025 A1 * | 10/2010 | Smith ............... B62B 1/12 280/47.27 |
| 2013/0153351 A1 | 6/2013 | House |
| 2013/0307238 A1 | 11/2013 | Campbell et al. |
| 2014/0138925 A1 | 5/2014 | Ono |
| 2014/0238799 A1 | 8/2014 | Sharma |
| 2015/0021870 A1 | 1/2015 | Lawrence |
| 2015/0091264 A1 | 4/2015 | Herbault et al. |
| 2016/0257327 A1 | 9/2016 | Gayk |

* cited by examiner

DOLLY FOR FIELD TECHNICIANS

FIELD

The present version of this device relates to the field of devices that can be used to transport equipment, tools, goods and other items from one location to another. The device can haul equipment such as test or analysis equipment and provides a collapsing shelf for using the equipment. The device also has a pocket compartment for holding a laptop securely during transport. Affixed to the pocket is a fold out work surface for taking notes or working on the laptop. The device has a second shelf with sliding adjustable holders for securing equipment to the second shelf. The device has wheels that roll smoothly over uneven surfaces. There are telescoping legs that can be used to keep the device stable on uneven surfaces when the user has reached the destination. A collapsing base that can be used to haul equipment, boxes and other large bulky or heavy items similar to a typical dolly. The handle is adjustable in the vertical direction to allow the user to adjust the second shelf and work surface to a height that is comfortable for user's of all heights to use and work upon.

BACKGROUND

This device relates to devices that can aid in the hauling of goods and equipment, and more particularly to a device that can be used to perform work, testing or analysis in the field similar to a portable office or a desk.

Many people need to haul goods or equipment into the field so that they can do their work or their jobs. Many times they need test equipment, tools, replacement parts, laptops, notebooks and other items to do their jobs. Many times they have to travel large distances with their equipment or tools to fix, repair or collect data for equipment operational analysis. This can involve unloading equipment from, for instance, a car or other transport vehicle and hauling the needed equipment into the field in the out of doors. Many have to transport manually by hand using back packs, tool bags or suitcase holders and others.

The device for hauling goods, tools, equipment into the field should have a relatively small footprint when being transported. If you can drive a truck into the field, then drive the truck. If you cannot, then the device that you use to haul goods into the field should be compact so that it can be transported as far as possible via vehicle and not take up excessive room in the vehicle so that there is room to transport the equipment needs to the job. The device should be of a compact size when it is not being used and transported.

Other users may have to travel long distances indoors within an existing plant via foot to get to a work site. If the worker has much equipment to haul into the field this could involve multiple trips with heavy loads. If the worker could not haul all the equipment needed into the field, then a second trip is needed. If the worker decides to "guess" what is needed then many times this too results in at least a second trip to get the parts or equipment actually needed. Not being able to get all equipment into the field at one time is inefficient, tiring and costs additional work time and possible equipment downtime losses.

If troubleshooting is required, the technicians may not know if the equipment is functioning properly and if it is not, then a second trip is needed to return to the vehicle or office to get the replacement parts. The equipment may require proprietary tools to collect data or remove parts for inspect and troubleshooting. It would be helpful for the field technicians if they could carry a significant stock of replacement parts, tools and equipment that they may need for the analysis, data collection or repairs.

With the new higher technology equipment, many times a laptop is needed in the field. With new electronic equipment, a data cable may be needed to collect information from the field equipment to import into the laptop for analysis and troubleshooting.

Once in the field, it can be difficult to find a secure surface to place a laptop for data collection or equipment troubleshooting. This can cause difficulties and result in placing, for example, the laptop or other electronic equipment on the ground where it may get wet or dirty and ultimately fail. Alternatively, the user may place the laptop or electronic equipment onto another horizontal surface or adjacent equipment which may contain liquids and increase the likelihood of getting dropped or bumped resulting in laptop or equipment breakage. This then requires a trip back to get a replacement laptop and results in increased work time, lessened efficiency and increased costs.

A flat surface may be needed to take notes or work on a piece of removed non functioning equipment. Tools may be needed to make the repairs or perform analysis or repair the equipment. It would be helpful to have a secure surface to facilitate repairs or inspection.

For the foregoing reasons, there is a need for a device that can be used to transport tools, replacement parts, analysis or data collection equipment to a work site. The device should be compact when not in use so that it is convenient to transport. The device should be able to carry many different sizes and weights of items that may be needed in the field. The device should have a horizontal surface that can help secure equipment to the device. The device should have a horizontal surface that can function as a work surface or laptop surface. The device should be securable when used on uneven surfaces to lessen the chances of dropping equipment or tools from the device. The device should have wheels that can facilitate the movement of equipment, tools or parts to a work site over uneven ground. The device should be adjustable in height so that a user can adjust the device to a height that is comfortable for working to lessen worker fatigue and increase efficiency.

For the above reasons, there is a need for a new, novel Dolly for Field Technicians.

SUMMARY

In view of the foregoing disadvantages inherent in the field of devices used to transport goods, equipment, tools and other items there is a need for a Dolly for Field Technicians.

A first objective of the device is to provide a device that is compact when not being used.

Another objective of the device is to provide a device that can transport items needed from one place to another.

An objective of the device is to provide a device that has a relatively small size when not being used to be easy to store and transport.

A second objective of the device is to provide a device that can be used to transport relatively heavy and bulky items from one place to another.

A third objective of the device is to provide a device that is adjustable in height.

It is yet another objective of the device to provide a device that can securely hold equipment.

A fourth objective of the device is to provide a device that can transport items across uneven surfaces without resulting in damage or dropping of the items being transported.

Another objective of the device is to provide a device that has telescoping legs to secure the device on uneven surfaces.

A fifth objective of the device is to provide a device that has a laptop pocket.

Another objective of the device is to provide a device that has a folding horizontal first shelf to work on a laptop or other tool.

A sixth objective of the device is to provide a device that a second folding horizontal shelf that has adjustable arms to help secure objects of various sizing.

It is a still further object of the device to provide a device having a folding base for transporting heavy or bulky items.

A seventh objective of the device is to provide a device that is durable.

An eighth objective of the device is to provide a device that is well thought out and ergonomic so that users will utilize the device.

An additional objective of the device is to provide a device that can be relatively easily manufactured in a cost effective manner.

These together with other objectives of this device, along with various features of novelty which characterize this device, are pointed out with particularity in the claims annexed hereto and forming a part of this disclosure. For a better understanding of this device, its operating advantages and the specific objectives attained by its uses, reference should be had to the accompanying drawings and descriptive matter in which there is illustrated a preferred embodiment of this version of the device.

DETAILED DESCRIPTION OF THE PREFERRED EMBODIMENTS

Figure 1:
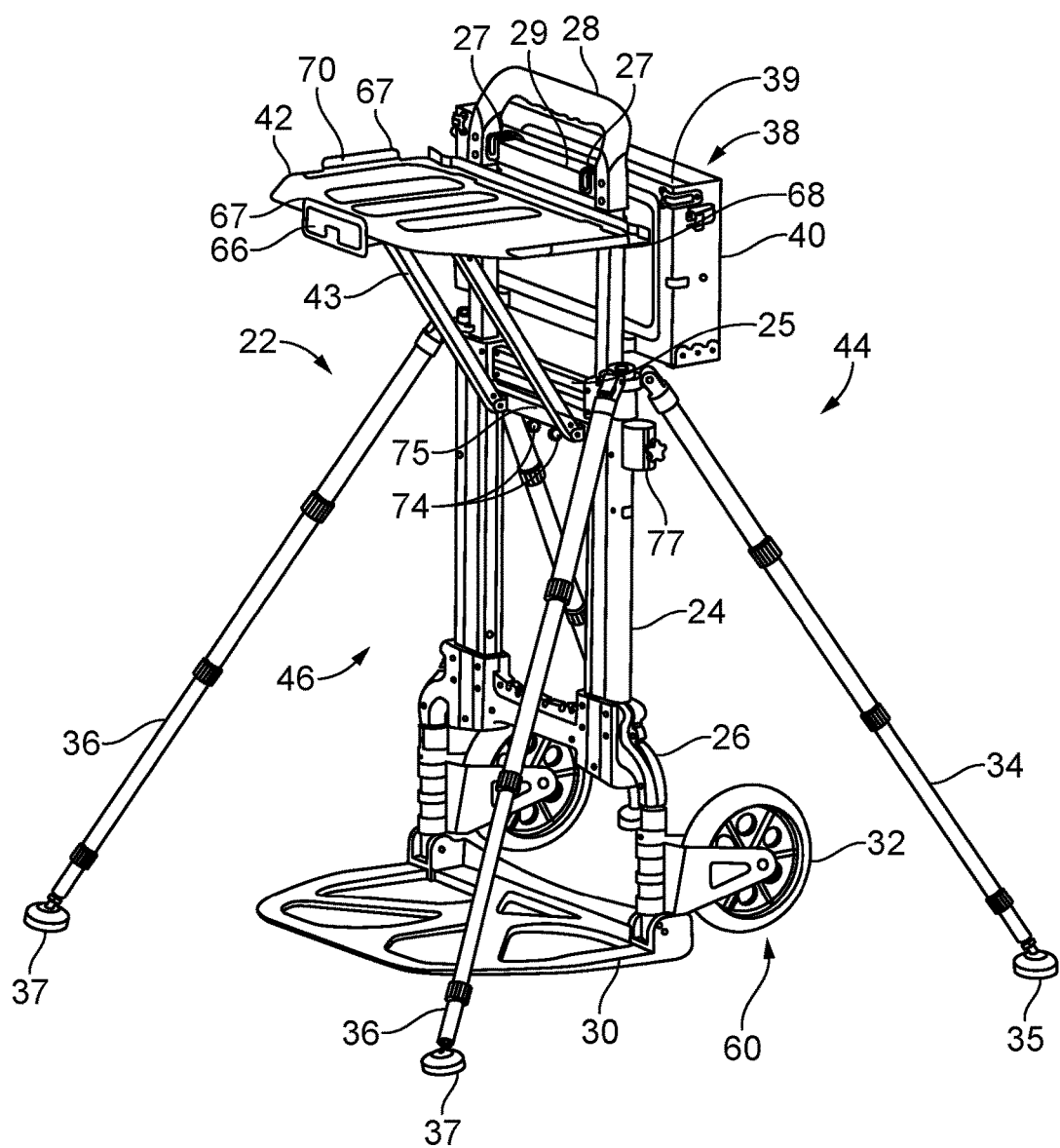
FIG. 1 shows a rear perspective view of one embodiment of the device in the open configuration.
Figure 2:
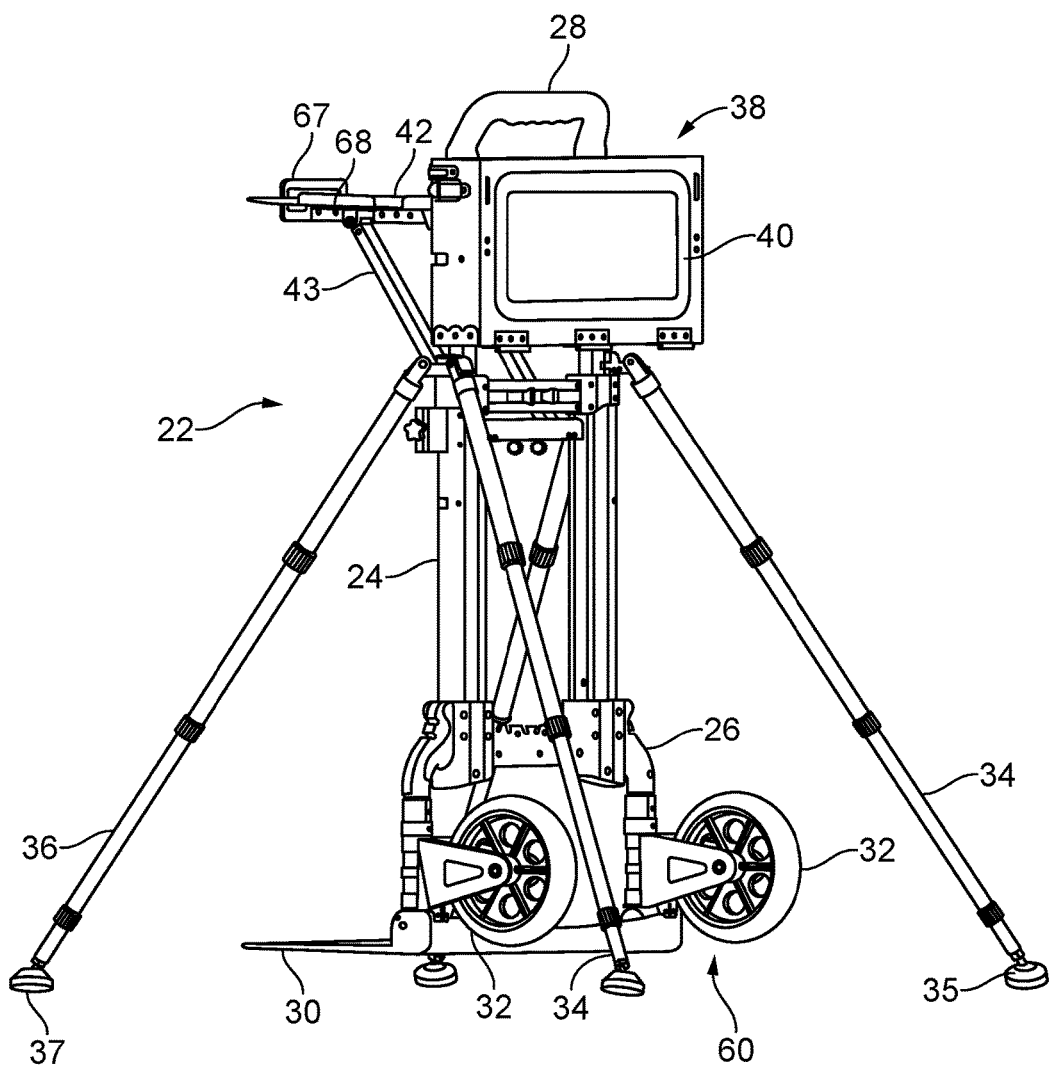
FIG. 2 shows a front perspective view of one embodiment of the device in the open configuration.
Figure 3:
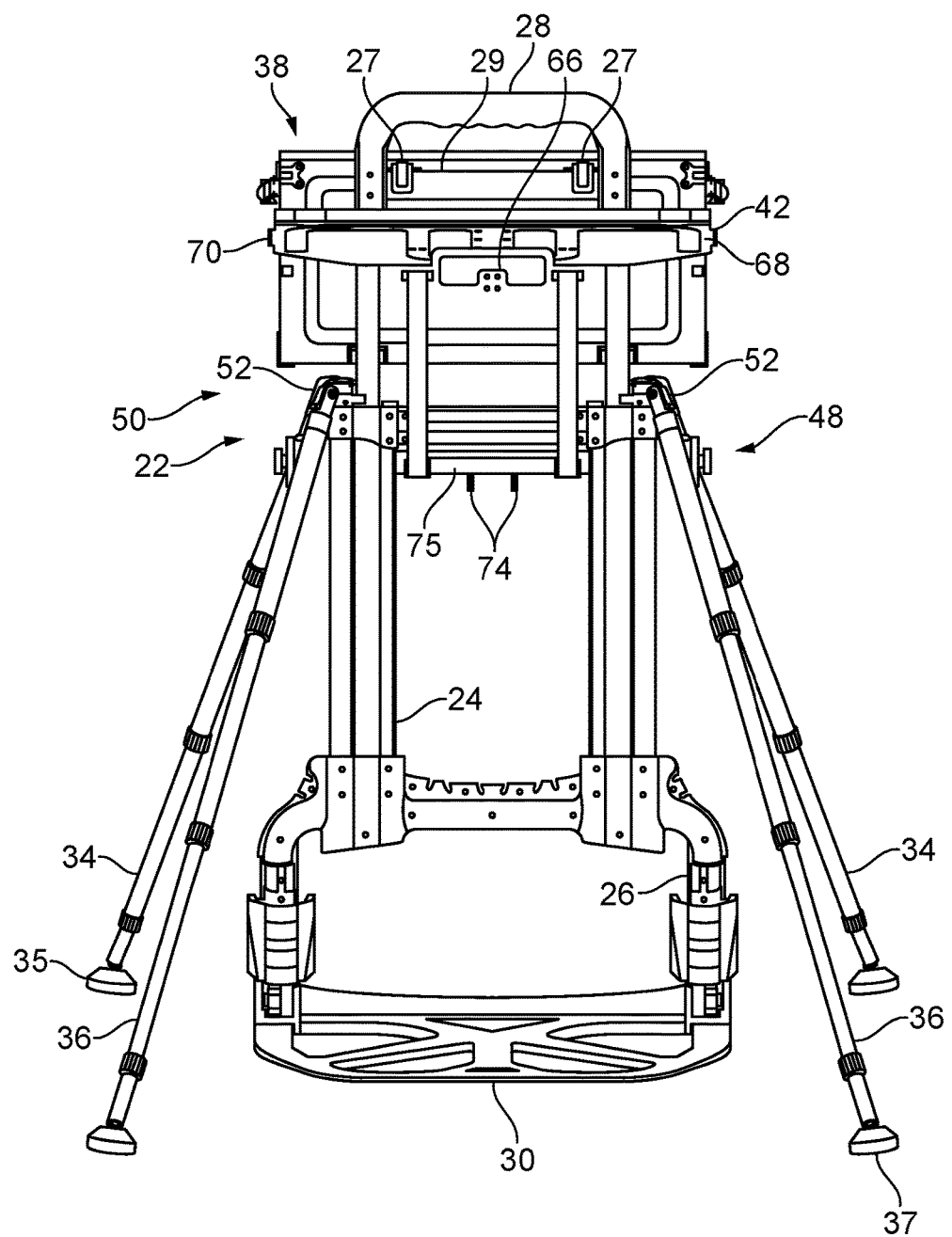
FIG. 3 shows a rear perspective view of one embodiment of the device in the open configuration.
Figure 4:
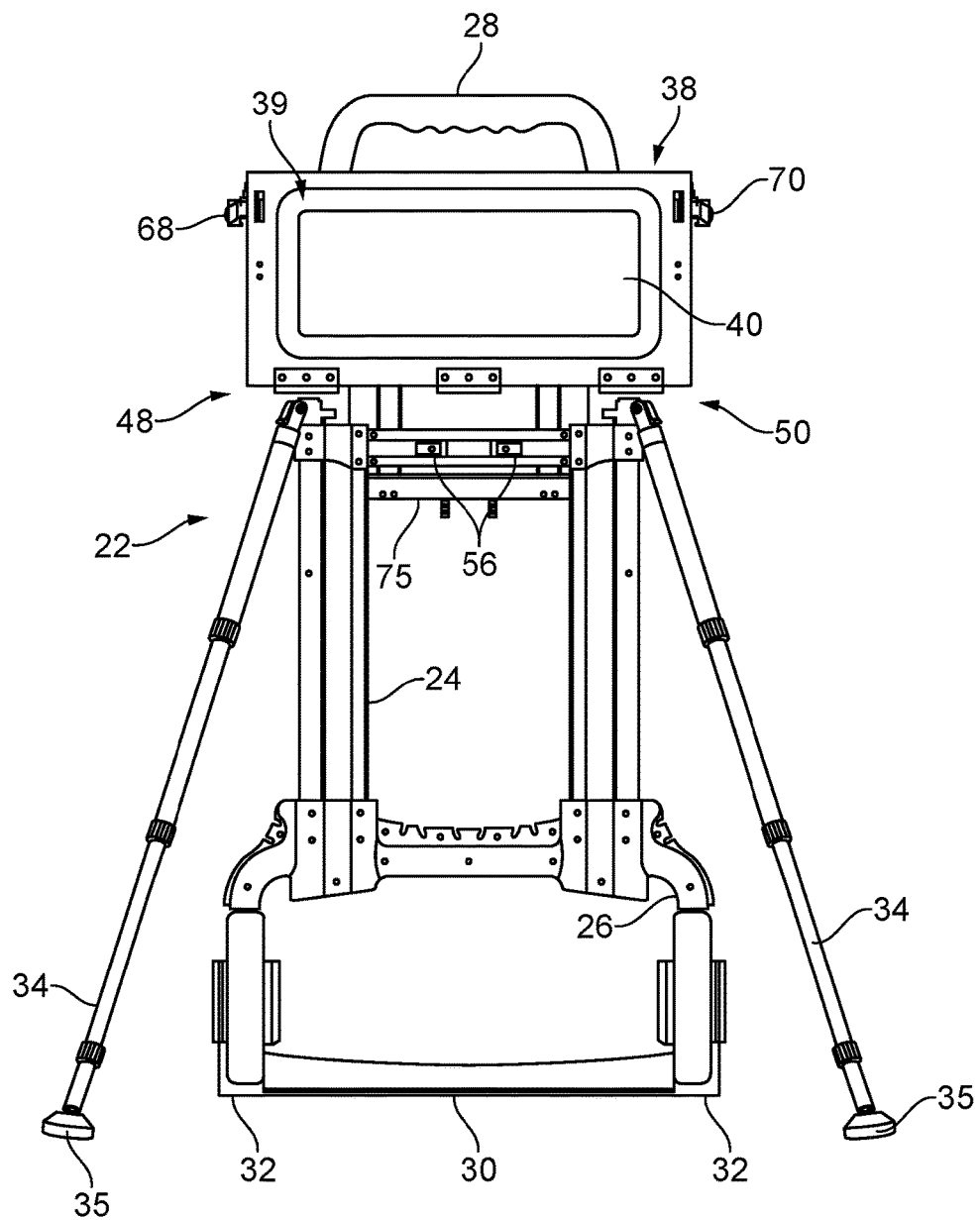
FIG. 4 shows a front view of one embodiment of the device in the open configuration.
Figure 5:
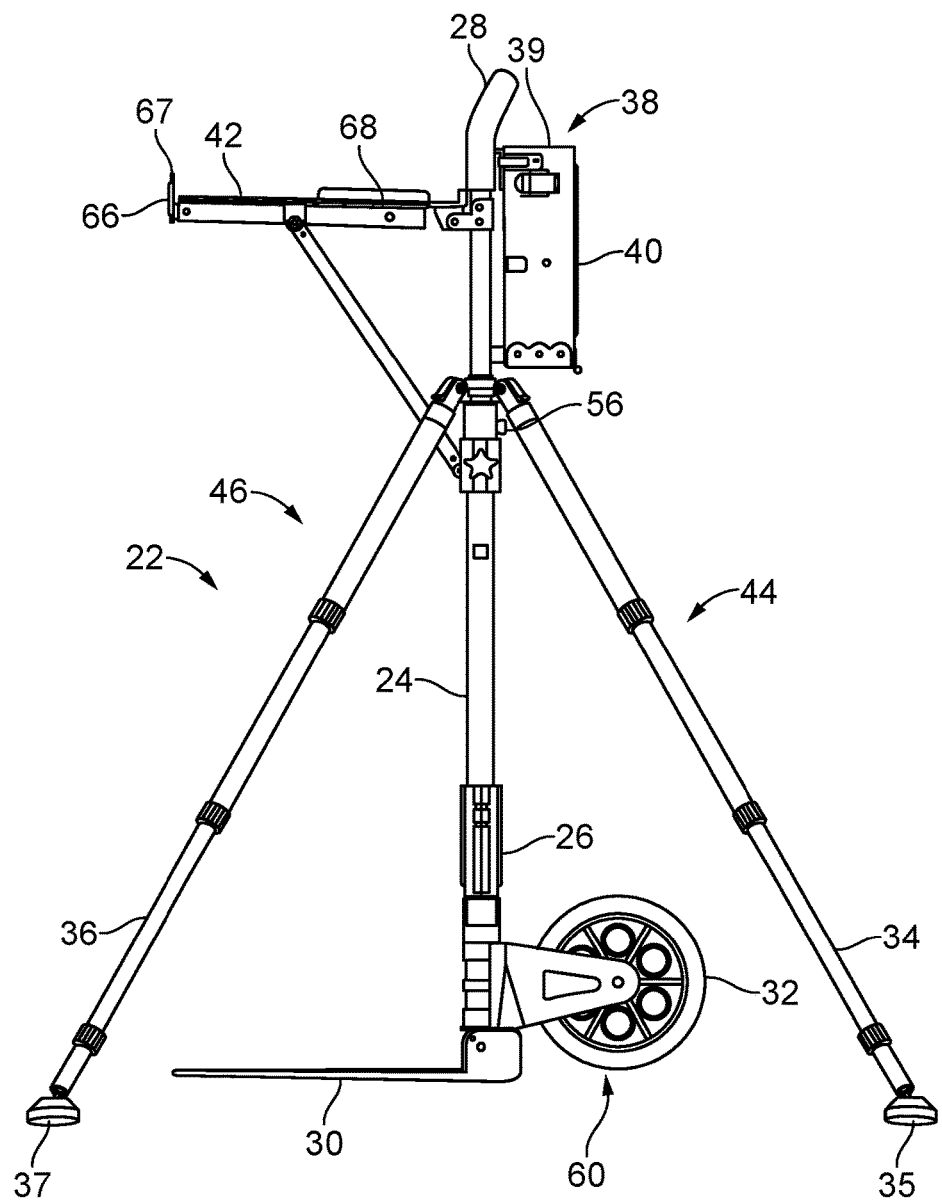
FIG. 5 shows a left side view of one embodiment of the device in the open configuration.
Figure 6:
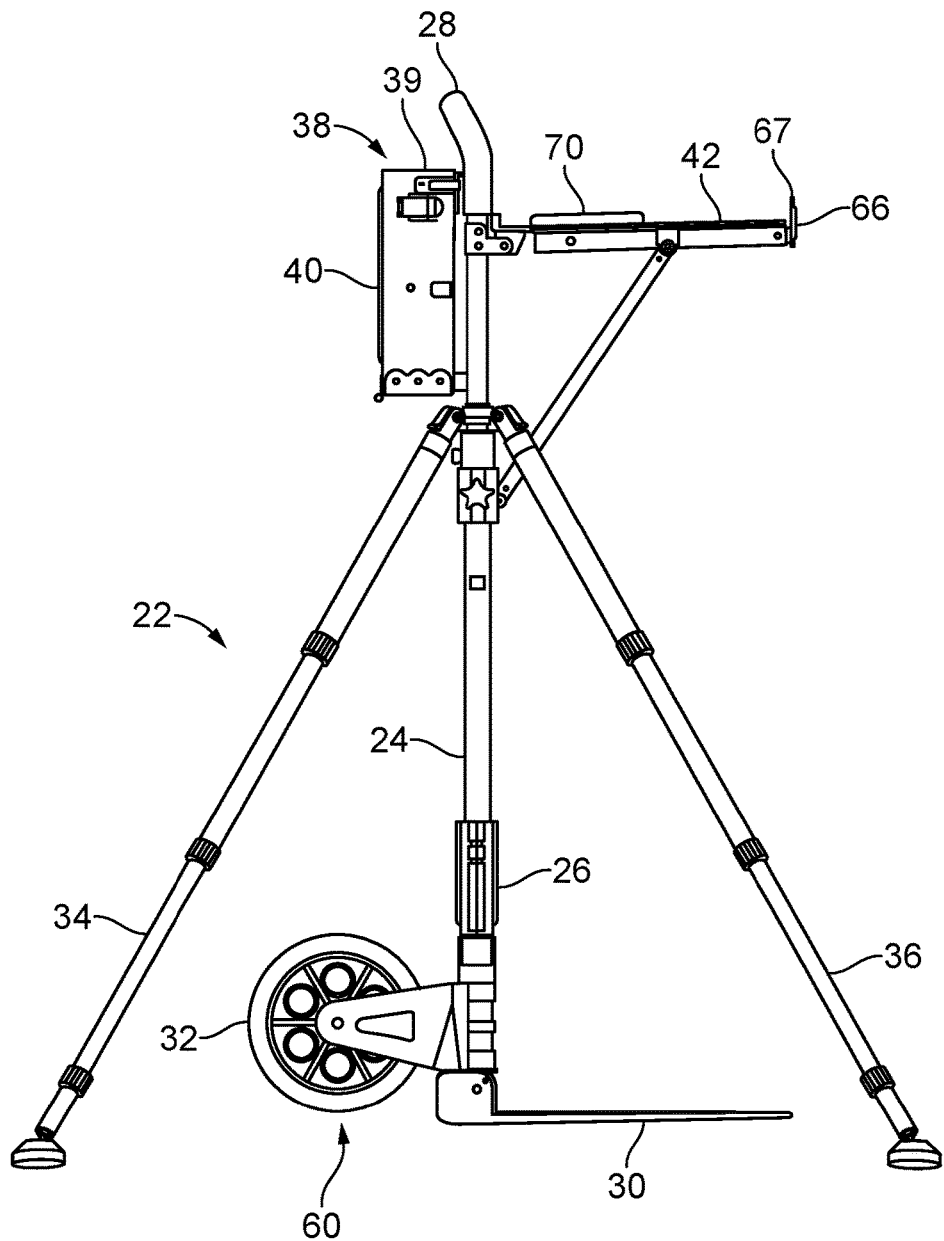
FIG. 6 shows a right side view of one embodiment of the device in the open configuration.
Figure 7:
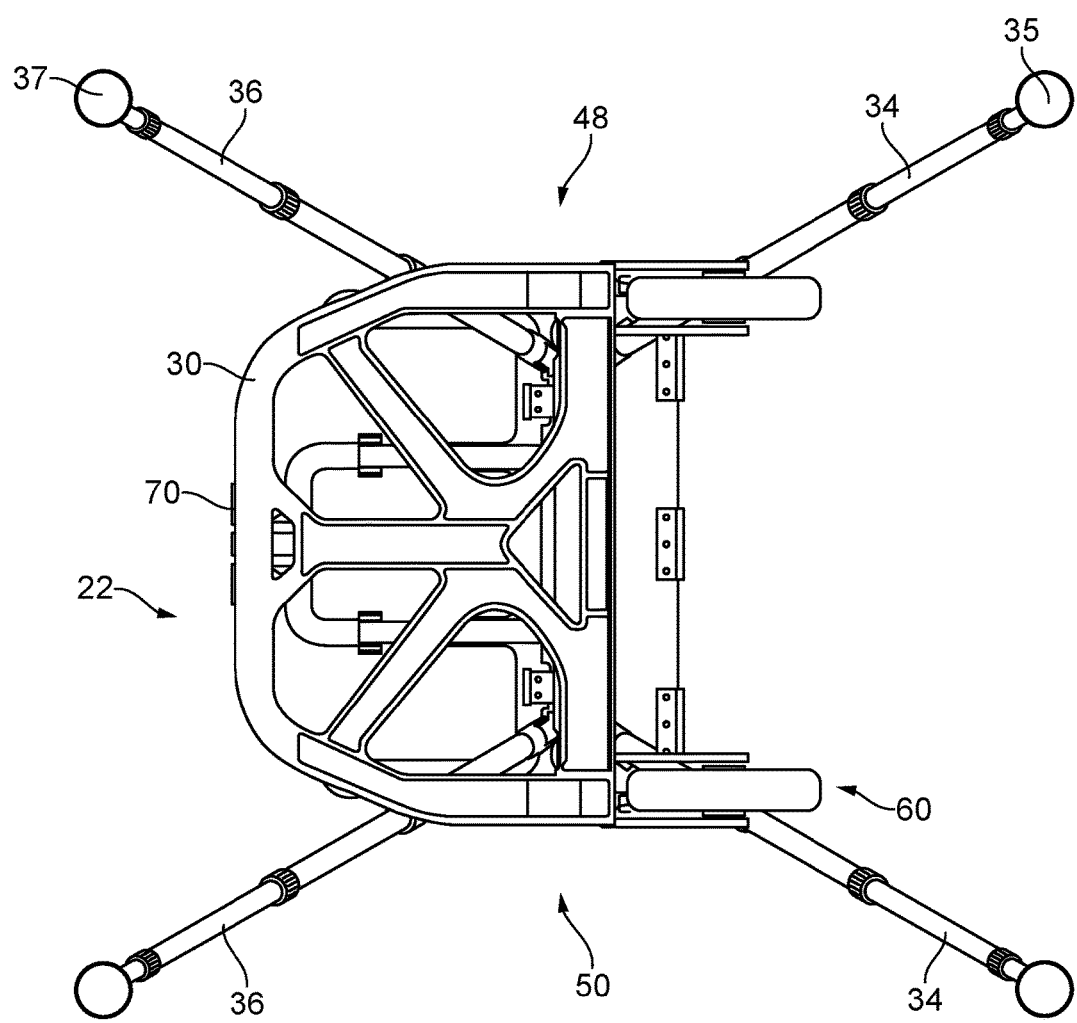
FIG. 7 shows a bottom view of one embodiment of the device in the open configuration.
Figure 8:
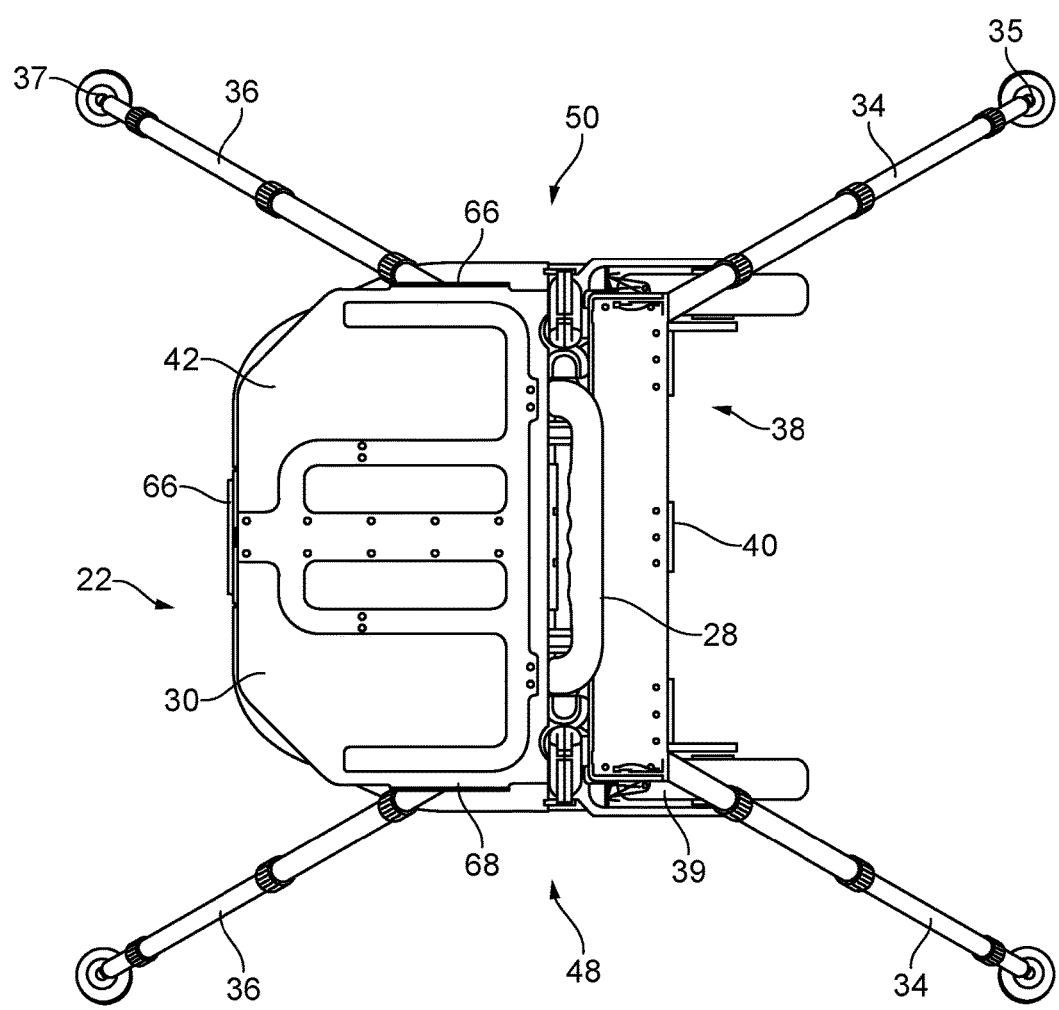
FIG. 8 shows a top view of one embodiment of the device in the open configuration.
Figure 9:
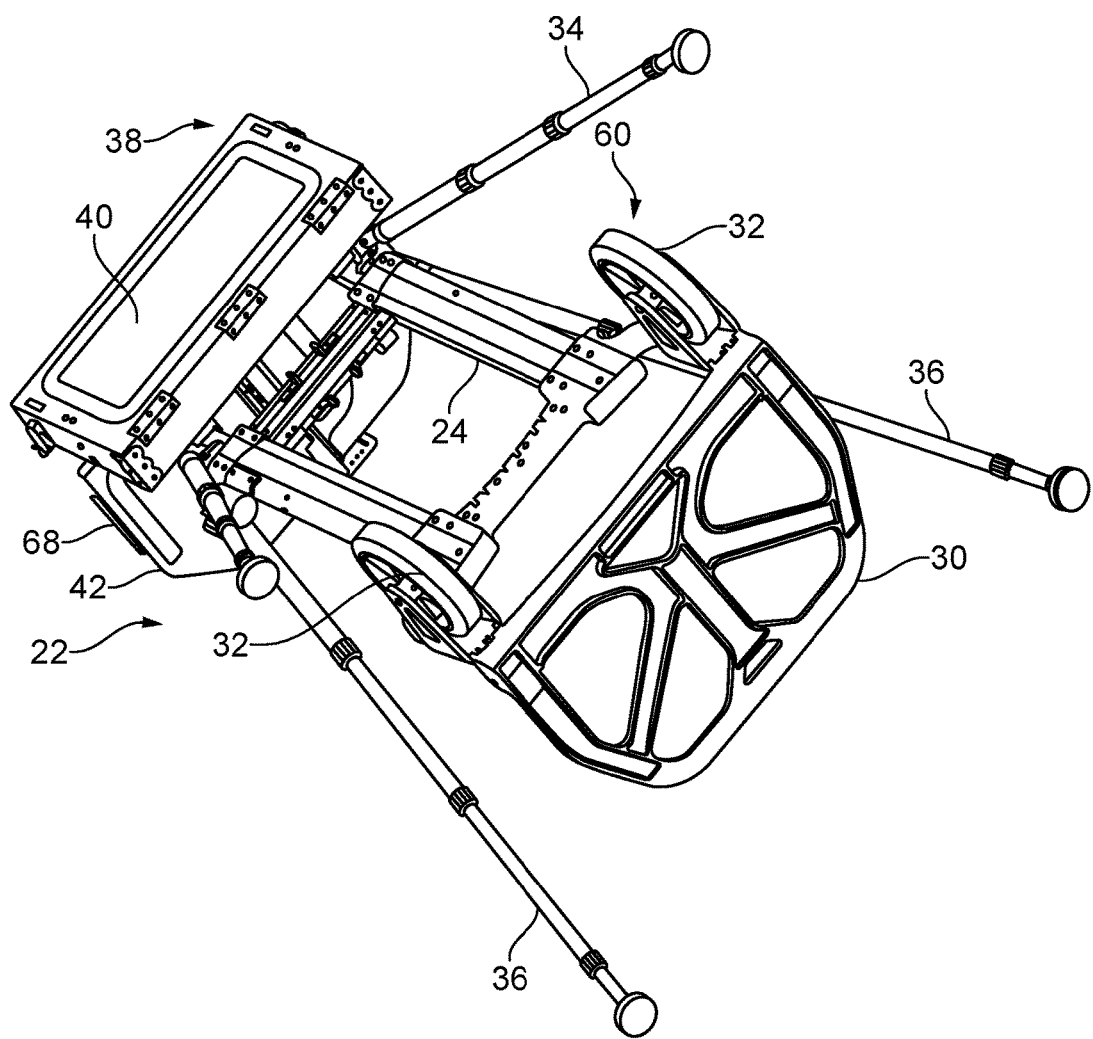
FIG. 9 shows a bottom perspective view of one embodiment of the device in the open configuration.

Referring to the drawings in detail wherein like elements are indicated by like numerals, there is shown in FIG. 1 one embodiment of a dolly 22 in the open configuration. The dolly 22 has a base 30 located near the bottom. The base 30 is connected to the lower frame 26. The lower frame 26 also houses the wheels 32. The wheels 32 are manufactured from a relatively soft material that helps cushing the dolly 22 when rolling over uneven surfaces. The lower frame 26 is connected to the frame 24, the frame 24 is rectangular in shape and has four sides. A horizontal support 25 is located near the top of the frame 24.

Near the top of each side of the frame 24 are affixed rear legs 36. Rear legs 36 are telescoping from the top of the frame 24 sides and adjustable. Near the top of the legs 34, 36 are located release buttons 52. The release buttons 52 are engaged to release the legs 34, 36 from the first or closed position (FIGS. 12-17) to the open or second position (FIGS. 1-11). The rear legs 36 can have multiple telescoping sections. At the bottom of each of the rear legs 36 is located foot 37. The feet 37 aid in helping the rear legs 36 in contact with even and uneven ground. The rear legs 36 both telescope and also rotate near the top away from and back to near the frame 24. FIG. 1 shows the rear legs 36 in the second position where they are deployed to stabilize the dolly 22 when it is being used at a fixed location.

FIGS. 14-17 show the rear legs 36 in the first position or storage position where they are located approximately parallel to the frame 24.

Near the top of each side of the frame 24 are affixed forward legs 34. Forward legs 34 are telescoping from the top of the frame 24 sides and adjustable. The forward legs 34 can have multiple telescoping sections. At the bottom of each of the forward legs 34 is located foot 35. The feet 35 aid in helping the forward legs 34 in contact with even and uneven ground. The forward legs 34 both telescope and also rotate near the top away from and back to the frame 24. FIG. 1 shows the forward legs 34 in the second position where they are deployed to stabilize the dolly 22 when it is being used at a fixed location.

FIGS. 14-17 show the forward legs 34 in the first position or storage position where they are located approximately parallel to the frame 24.

A u-shaped handle 28 is slidably attached to the frame 24 where each leg of the handle 28 is slidably adjustable in the frame 24.

On the second side 46 of the dolly 22 and attached to the handle 28 is located a second shelf 42. The second shelf 42 has a pair of supports 43, which engage the bottom of the shelf 42 and also are affixed to sliding member 75 located near the top of the frame 24. The supports 43 allow the second shelf 42 to rotate from a vertical position near the handle to a horizontal position and fixed relative to the handle 28. A pair of release tabs 74 can be engaged which allow the bottom of the supports 43 to slide down relative to the frame 24 and allow the second shelf 42 to rotate to the closed position, as an example FIG. 12.

The dolly 22 on the first side 44 has a pocket 38 affixed to the handle 28. The pocket 38 has a compartment 39 open to the top for transporting items such as a lap top (not shown). One side of the pocket 38 has a first shelf 40. The first shelf 40 is hinged to the bottom of the pocket 38 and can be rotated from against the pocket 38 in a vertical position to a horizontal position where it forms a working surface for as an example, a lap top computer. The pocket 38 is retained on cross member 29 with a pair of hooks 27. The pocket 38 can be lifted and removed from the dolly 22 cross member 29.

Near the bottom of the frame 24 is located the lower frame 26. On the second side 46 near the bottom of the frame 24 is located the base 30. The base 30 is rotatable from a horizontal position to a vertical position, FIGS. 1, 14. When the base 30 is in the horizontal position, it can be used as a typical dolly to transport heavy or bulky items. When the base 30 is not being used, it is typically rotated to the vertical position to near the lower frame 26, FIGS. 14-17.

Near the bottom of the frame 26 and on the first side 44 are located the wheels 32. Wheels 32 are for providing rolling transport to the dolly 22. The wheels 32 rotate from a first position 60 where the wheels 32 are perpendicular to the lower frame 26, FIGS. 1, 5 and a second position where the wheels 32 are parallel to the lower frame 26, FIGS. 16, 17.

Figure 10:
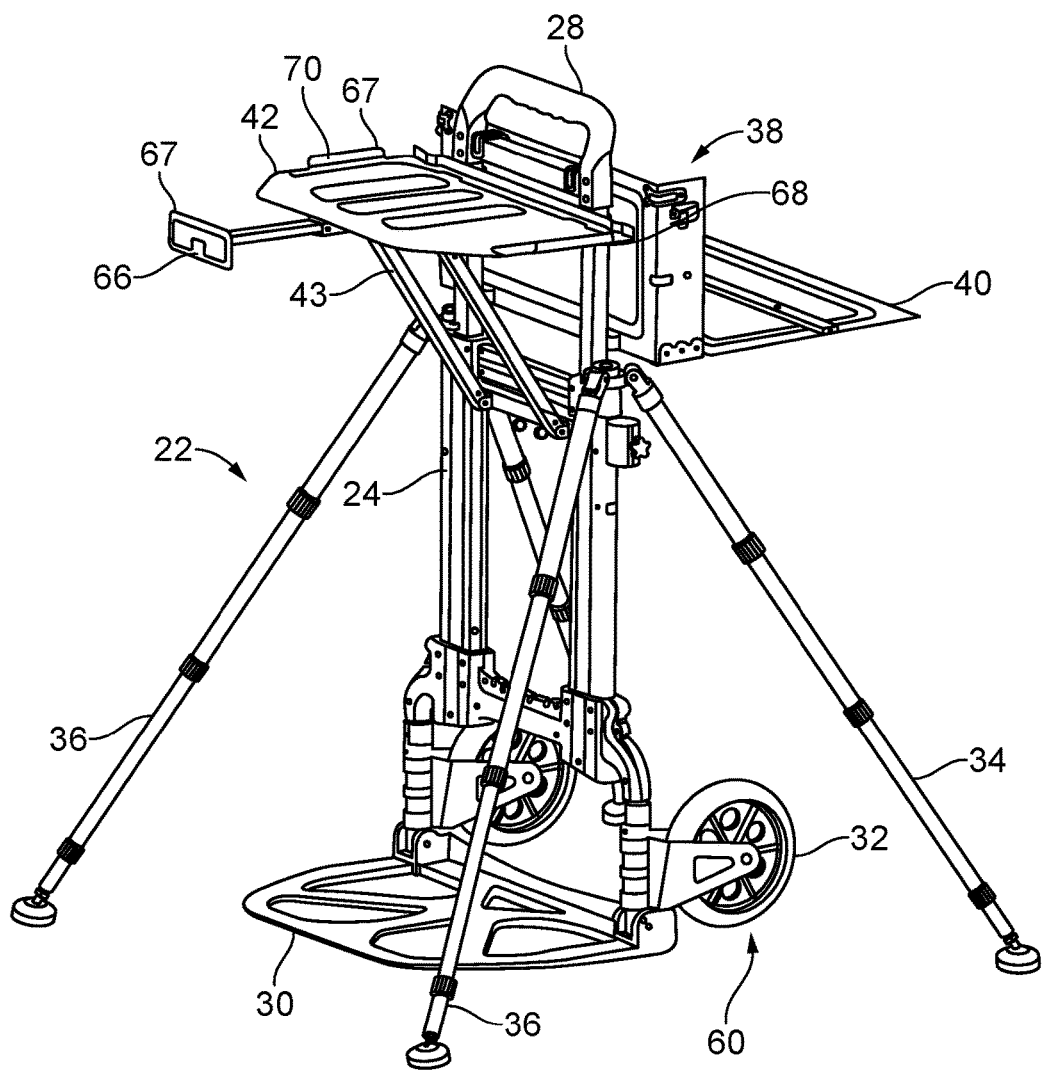
FIG. 10 shows a rear perspective view of one embodiment of the device in the open configuration in the open configuration.
Figure 11:
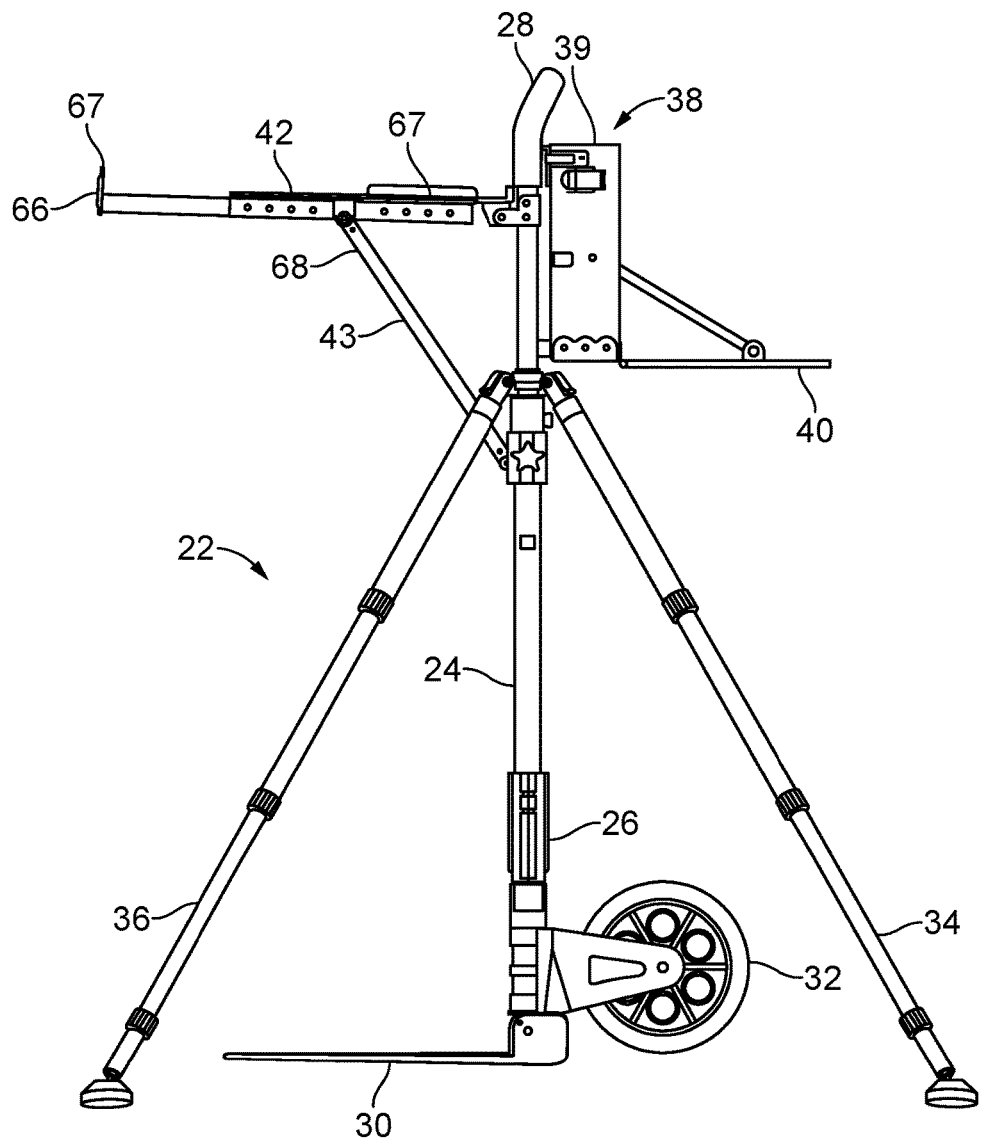
FIG. 11 shows a left side view of one embodiment of the device in the open configuration.

FIG. 1 shows the second shelf 42 in the horizontal or working position. Also can be seen the second shelf 42 has first, second and third holders 66, 68, 70 one on each of the edges of the second shelf 42, FIGS. 4, 5. Each of the holders is configured such that they can be adjusted away from the edges of the second shelf 42 and have a vertical element 67 that would engage the edge of the item placed on second shelf 42. This would aid in retaining any item placed on the second shelf 42 from slipping from the second shelf 42. FIGS. 10, 11 show the first holder 66 in an extended position relative to the second shelf 42.

FIGS. 10 and 11 show the first shelf 40 in the deployed position where it is rotated to the horizontal position and where it can be used for a work surface or laptop computer surface.

Figure 12:
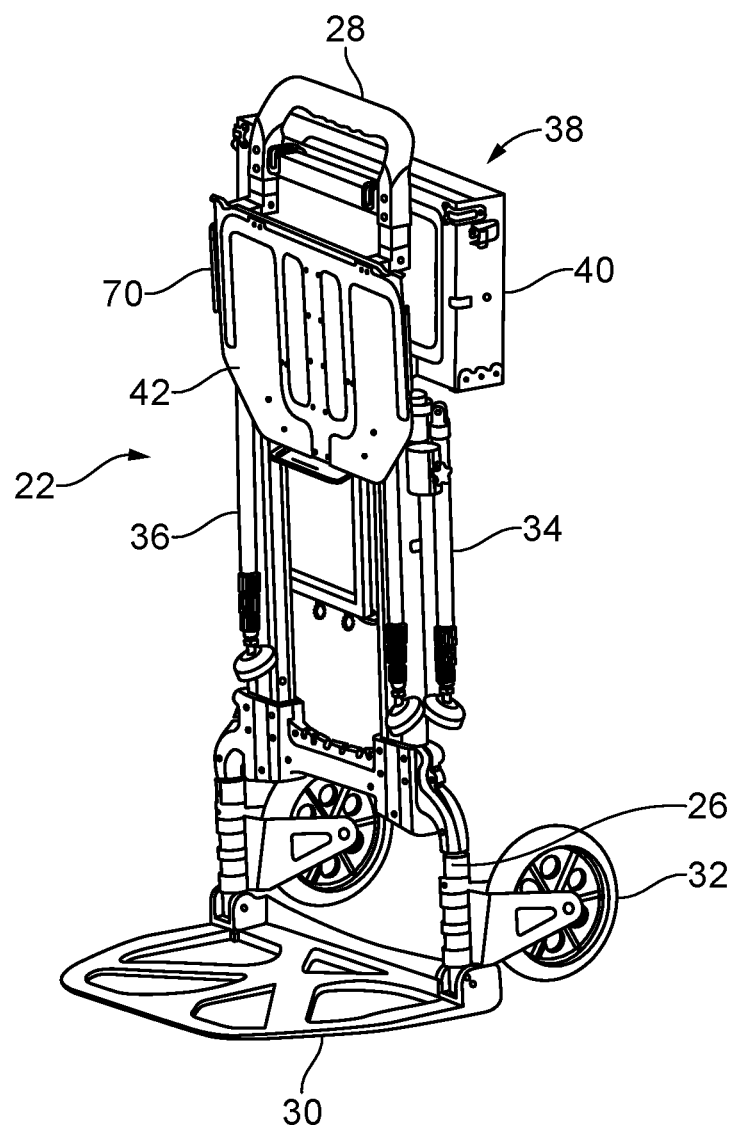
FIG. 12 shows a rear perspective view of the device with most of the elements closed for storage or transport.
Figure 13:
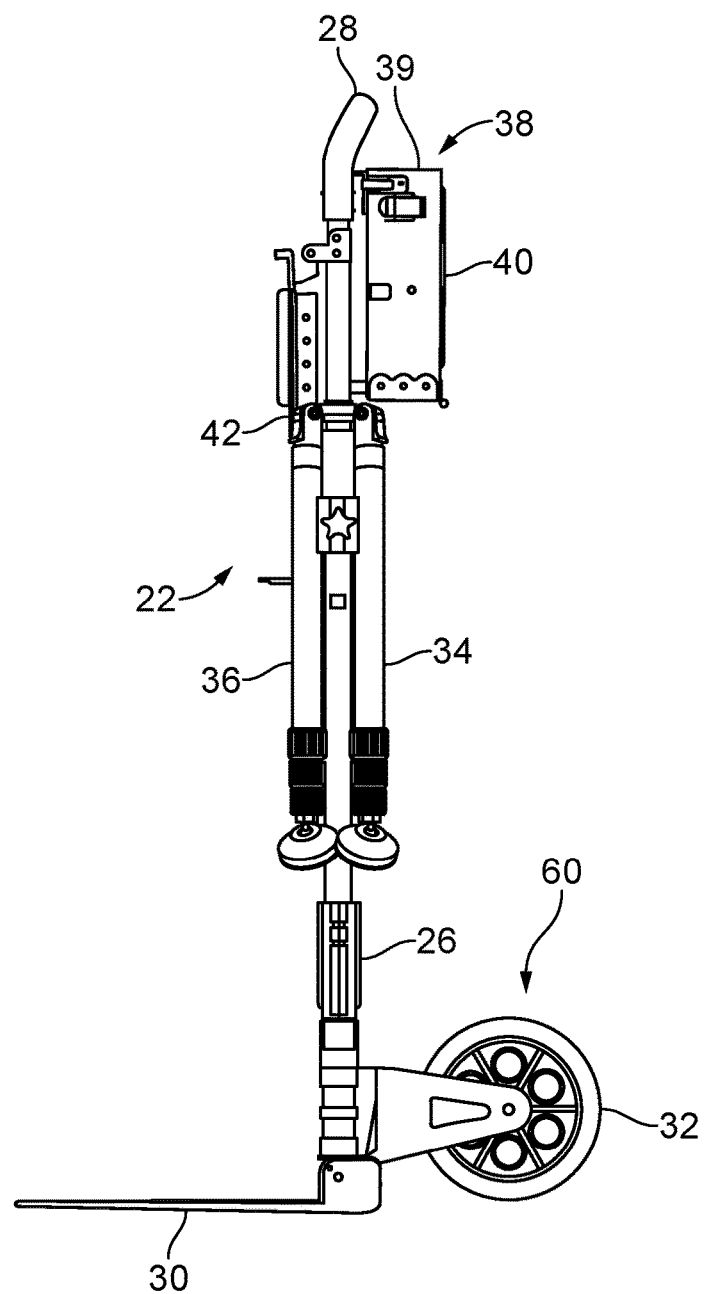
FIG. 13 shows a left side view of the device with most of the elements closed for storage or transport.

FIGS. 12, 13 show the base 30 of the dolly 22 in the deployed or horizontal position. In this position the base 30 can have items that need to be carried placed upon the surface to be carried and transported like a typical dolly.

Figure 14:
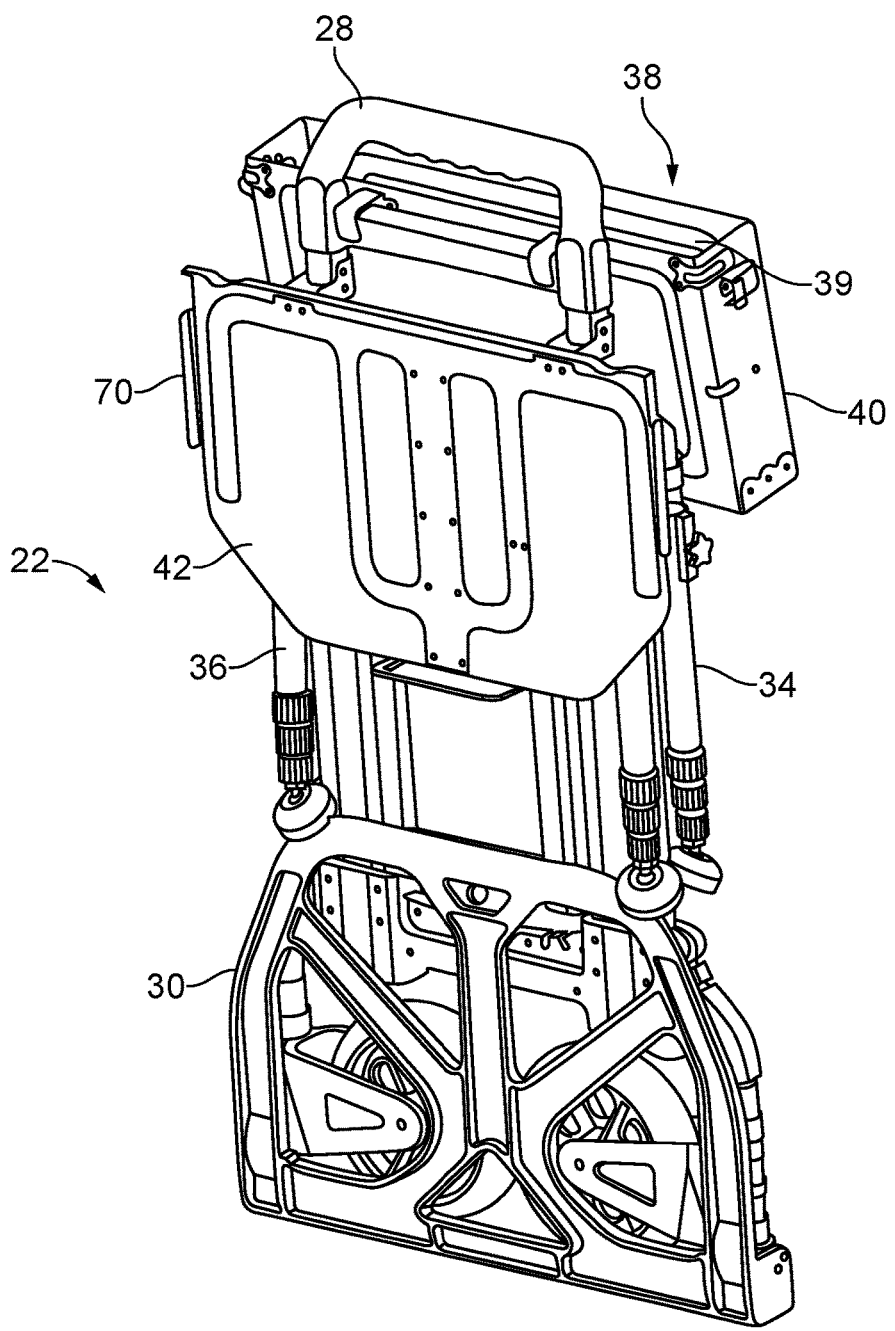
FIG. 14 shows a rear perspective view of the device in storage configuration.
Figure 15:
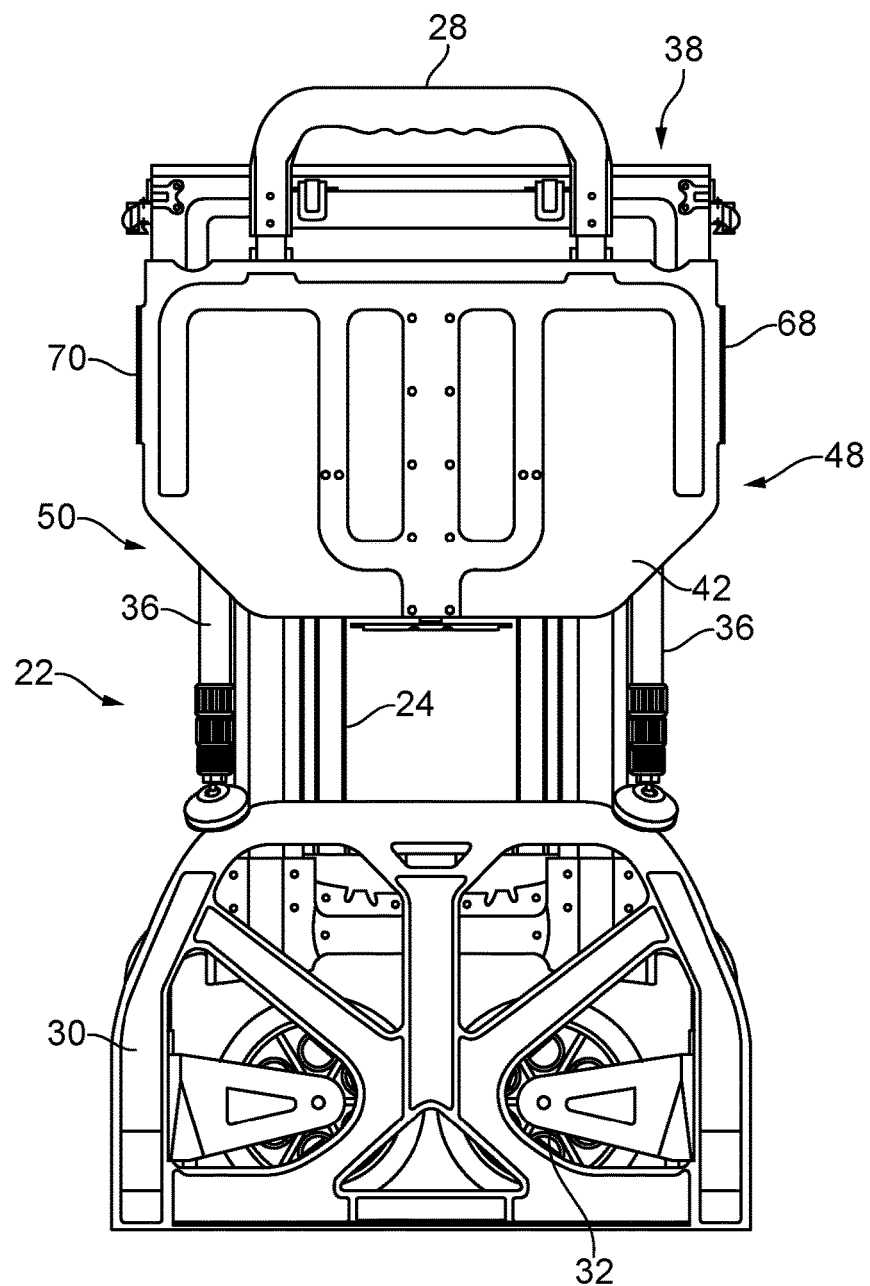
FIG. 15 shows a rear view of the device in storage configuration.
Figure 16:
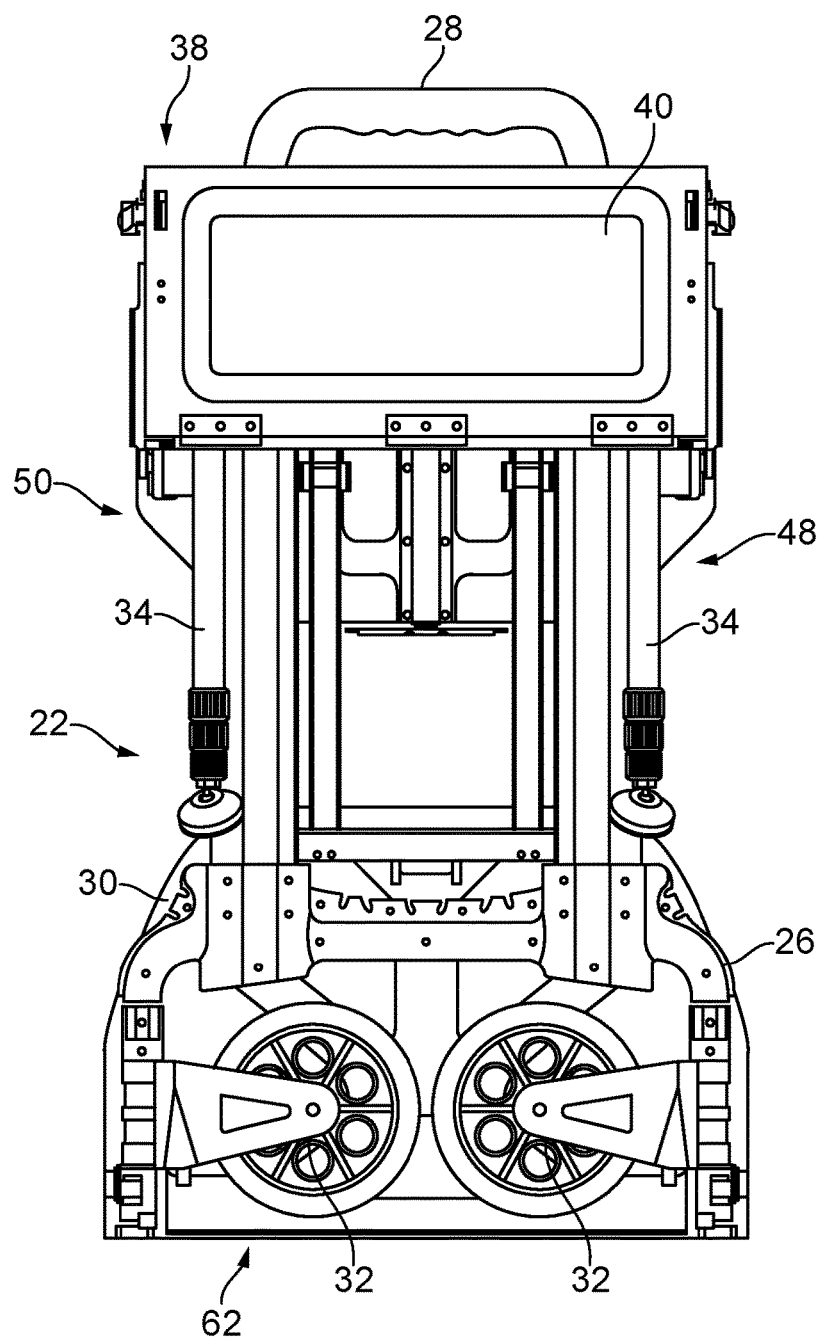
FIG. 16 shows a front view of the device in storage configuration.
Figure 17:
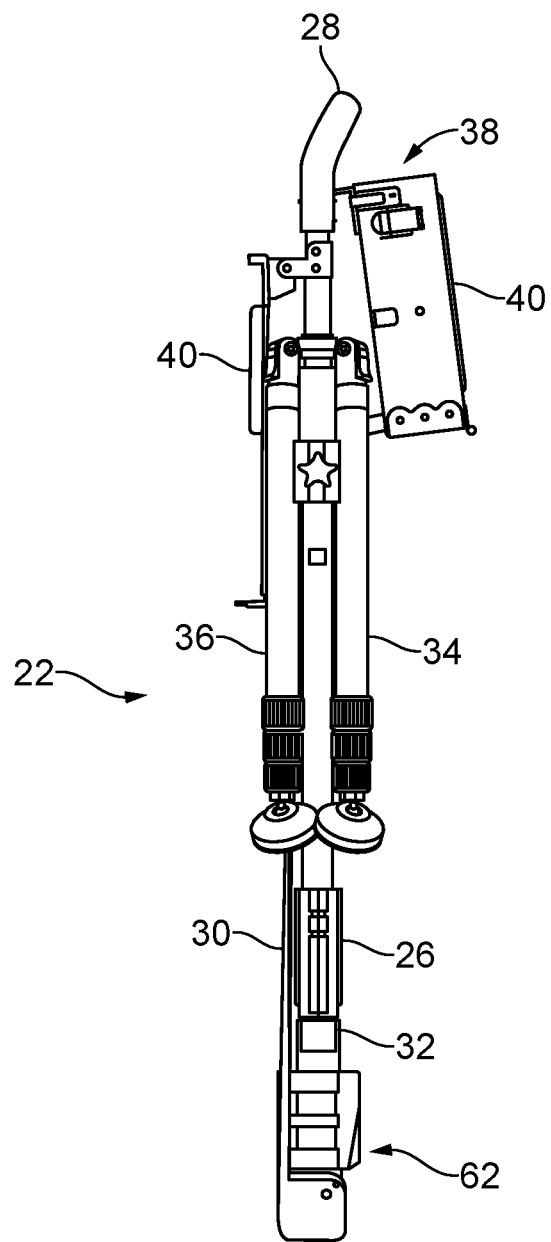
FIG. 17 shows a left side view of the device in storage configuration.

FIGS. 14-17 show various views of the dolly 22 in the storage configuration. In this configuration the device is meant to be packed for transport to the work area where the various elements are then adjusted so that dolly 22 can transport items. FIGS. 14, 15 show the base 30 in the vertical position and the second shelf 42 in the vertical position, as can be seen the legs 36 have also been put into the minimized position, shortest position and rotated to a position near the frame 24. FIGS. 16, 17 show the wheels 32 parallel to the lower frame and the first shelf 40 in the vertical position against the pocket 38. As can be seen in FIGS. 14-17 the dolly 22 is of a very compact size when in this position.

To use the dolly 22 assuming that it is in the configuration shown in FIGS. 14-17 the user would place the wheels 32 on the ground and rotate the wheels 32 from the position parallel to the lower frame 26 to the perpendicular position shown, for example, in FIG. 1. If a heavy load, tools, parts, equipment needs to be transported, then the base 30 would be disengaged from the position shown in FIGS. 14-17 to the horizontal position shown in, for example, FIG. 1. This would allow the placement of boxes, equipment, tools, boxes etc. and the dolly 22 could be used as a common dolly. If a user requires a laptop computer or other smaller tools, they could be inserted into the top of the pocket 38 compartment 39 and the dolly 22 could be wheeled to the work site. The user could grasp the handle 28 and pull the dolly 22 to the work site.

When arriving at the work site, the user could unpack, for example, any equipment from the base 30. The release button 52, FIG. 3, would be pressed and rear legs 36 could be rotated from the frame 24 and the telescoping rear legs 36 could each be elongated until the feet 37 are in contact with the ground, by example FIG. 1. Next, the user would engage the release button 52 on the forward legs 34 to disengage legs 34 from near the frame and the telescoping forward legs 34 could each be elongated until the feet 35 are in contact with the ground, by example FIG. 1. If needed first shelf 40 could be configured into the horizontal position, by example FIG. 1, and as an example a laptop computer could be placed upon the first shelf 40 to engage in work, FIG. 10.

The second shelf 42 could be rotated from the vertical position in FIGS. 12-15 to the horizontal position shown in FIG. 1. As an example a tool box could then be placed upon the surface of the second shelf 42. The first, second and third holders 66, 68, 70 could be adjusted away from the second shelf 42 such that the vertical elements 67 on the holders 66, 68, 70 engage the edges of the tool box to provide greater stability to the tool box to aid in preventing the tool box from sliding from the second shelf 42, not shown.

It should be noted that base 30 could be left in the horizontal position, FIG. 1, when the dolly 22 legs 34, 36 are deployed which adds to the stability of the dolly 22.

Figure 18:
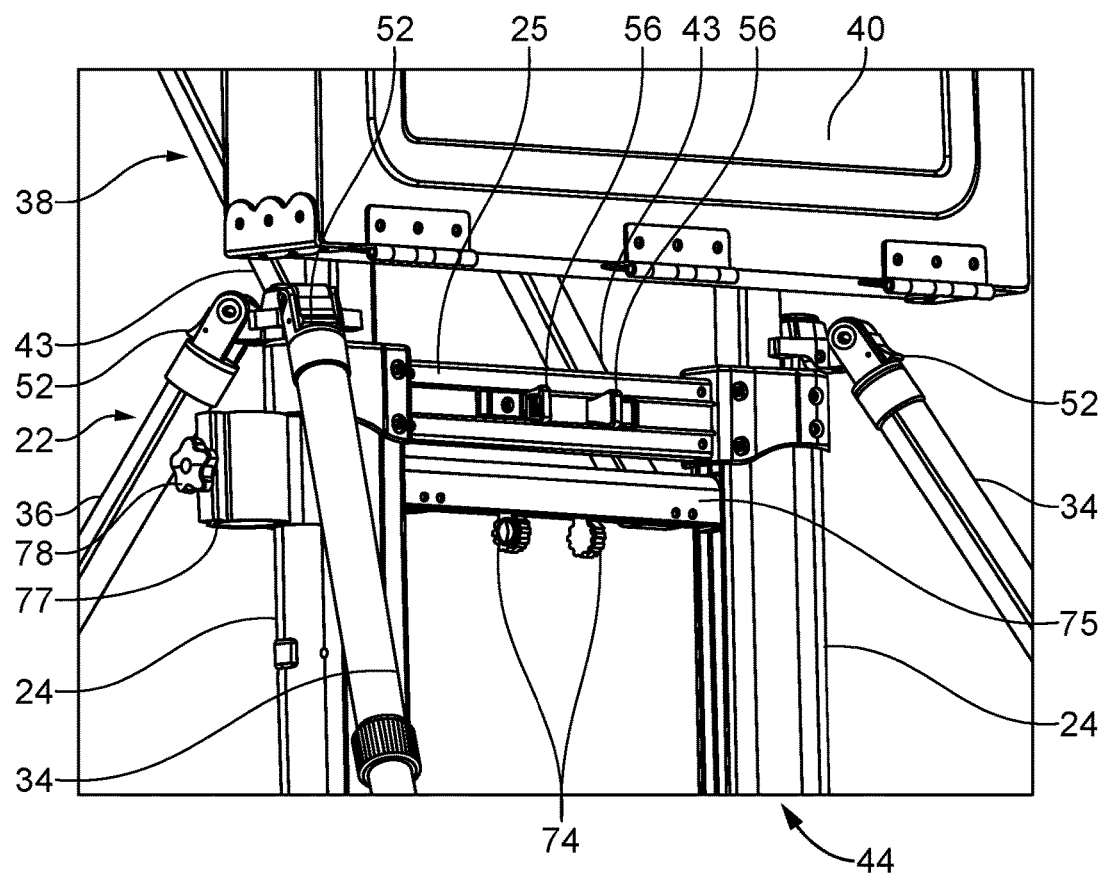
FIG. 18 shows a partial closeup of a front perspective view.

FIG. 18 shows a partial close up of a front perspective view showing more details of the dolly 22. In this view the release button 52 near the top of the legs 34, 36 can more clearly be seen. Also shown is a view of the handle release 56 which is located in the horizontal member 25. The handle release 56 when engaged allows release of the handle 28 to raise and lower handle 28 relative to the frame 24.

Also shown are release tabs 74 which are located in the sliding member 75. The release tabs 74 when engaged, allow the supports 43 to be raised and lowered relative to the frame 24 such that the second shelf 42 (not shown) can be rotated from the horizontal position to the vertical position.

Also shown is a cylinder 77. Cylinder 77 is arranged and configured to retain other items such as an umbrella (not shown). The cylinder 77 has a knob 78 which is threaded and can be used to retain an item in the cylinder 77 such as an umbrella. An item such as an umbrella would be used to keep sun and rain off of the user when used in the outdoors.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

We claim:

1. A dolly device for field technicians, the device comprising:
   a frame, the frame having a first side and a second side;
   a lower frame, the lower frame affixed to the frame, the lower frame having a first side and a second side;
   a pair of wheels attached to the first side of the lower frame, the wheels rotatable from a position parallel to the lower frame to a position perpendicular to the lower frame;
   a base, the base attached to the second side of the lower frame, the base rotatable relative to the lower frame from a position parallel to the lower frame to a second position perpendicular to the lower frame;
a pair of forward legs affixed near the top of the frame on the first side;
a pair of rear legs affixed near the top of the frame on the second side;
the forward legs on the first side having a release button, the release button for adjusting the legs from a position near the frame to a position away from the frame;
the legs on the second side having a release button, the release button for adjusting the legs from a position near the frame to a position away from the frame;
the legs having telescoping sections such that the length can be increased and decreased;
feet located at the bottom of each of the legs;
a handle, the handle having a cross member;
the handle inserted into the top of the frame;
a handle release, the handle release located in the cross member, the handle release for allowing the handle to translate up and down relative to the frame;
a second shelf, the second shelf slidably affixed at one end to the handle;
the second shelf having a first holder a second holder and a third holder, the holders affixed to the bottom of the second shelf, the holders adjustable from a position near the edge of the second shelf to a position away from the second shelf;
a pair of supports, the supports affixed at one end to the bottom of the second shelf and affixed to the sliding member at the other end;
a pocket, the pocket having a compartment, the pocket having a first shelf, the compartment for storing and transporting items; and
the pocket having a pair of hooks, the hooks for retaining the pocket to the cross member and allowing the pocket to be removed from the cross member.

2. The dolly device of claim 1, further comprising:
a cylinder, the cylinder located near the top of the frame, the cylinder having a knob, the knob for securing items placed in the cylinder such as an umbrella.

3. The holders of claim 1, further comprising:
the holders having vertical elements near the ends, the vertical elements for aiding in securing items placed on the second shelf.

4. The wheels of claim 1, wherein:
the wheels are manufactured from soft material.

5. The forward legs of claim 1, wherein:
the forward legs are telescopically adjustable in length.

6. The rear legs of claim 1, wherein:
the rear legs are telescopically adjustable in length.

7. The first shelf of claim 1, wherein:
the first shelf is rotatable from a first position parallel to the pocket to a second position perpendicular to the pocket.

8. A dolly device for field technicians, the device comprising:
a u-shaped handle, the handle having a cross member;
a frame, the handle inserted into the frame, the frame having a horizontal member, the horizontal member having handle release, the handle release for retaining and releasing the handle;
a lower frame, the lower frame attached to the frame, the lower frame having a first side and a second side;
a base, the base affixed to the second side of the lower frame, the base rotatable from a position parallel to the lower frame to a position perpendicular to the lower frame;
a pair of wheels, the wheels affixed to the first side of the lower frame, the wheels rotatable from a position parallel to the lower frame to a position perpendicular to the lower frame;
a pair of forward legs, the forward legs affixed on a first end to the top of the frame on the first side;
a pair of rear legs, the rear legs affixed on a first end to the top of the frame on the second side;
feet, the feet attached to the second end of the forward legs;
feet, the feet attached to the second end of the rear legs;
a pocket, the pocket having a compartment, the pocket having a first shelf, the first shelf affixed to the pocket, the first shelf rotatable from a first position parallel to the pocket to a second position perpendicular to the pocket;
a second shelf, the second shelf affixed at one end to the handle;
a pair of supports, the supports affixed at one end to the sliding member, the second end of the supports affixed to the second shelf, the second shelf rotatable from a first position parallel to the handle and to a second position perpendicular to the handle;
a first holder, the first holder located on one side of the shelf;
a second holder, the second holder located on a second side of the shelf;
a third holder, the third holder located on a third side of the shelf; and
the holders translatable from a position near the shelf to a second position away from the shelf, the holders for securing items on the shelf.

9. The dolly device of claim 8, further comprising:
a cylinder, the cylinder located near the top of the frame, the cylinder having a knob, the knob for securing items placed in the cylinder such as an umbrella.

10. The wheels of claim 8, wherein:
the wheels are manufactured from soft material.

11. The forward legs of claim 8, further comprising:
the forward legs are telescopically adjustable in length.

12. The rear legs of claim 8, further comprising:
the rear legs are telescopically adjustable in length.

13. The pocket of claim 8, further comprising:
the pocket having a pair of hooks, the hooks for releasably securing the pocket to the cross member.

14. The holders of claim 8, further comprising:
each of the holders having a vertical element, the vertical elements for aiding in securing items to the second shelf.

15. A dolly device for field technicians, the device comprising:
a pair of wheels;
a lower frame, the lower frame having a first side and a second side;
a base;
the wheels affixed to the first side of the lower frame, the wheels rotatable from a first position parallel to the lower frame to a second position perpendicular to the lower frame;
the base affixed to the second side of the lower frame, the base rotatable from a first position parallel to the lower frame to a second position perpendicular to the lower frame;
a frame, the frame having a horizontal member, the frame having a first side and a second side, the frame affixed to the lower frame, the horizontal member having a handle release;

a handle, the handle having a horizontal member, the handle having a first side and a second side, engaging the handle release allows the handle to translate relative to the frame;

a pair of forward legs, the forward legs affixed at the top end to the first side of the frame;

a pair of rear legs, the rear legs affixed at the top end to the second side of the frame;

a pocket, the pocket having a compartment, the pocket having a first shelf, the pocket having a pair of hooks, the hooks for engaging the cross member and removably securing the pocket to the first side of the handle;

a second shelf, the second shelf affixed to the handle on one end; and a pair of supports, the supports affixed to the sliding member at one end, the second end secured to the second shelf.

16. The forward legs of claim 15, further comprising:

a release button, the release button located near the top end of the legs, the release button for releasing the forward legs from a first position nearly parallel to the frame to a second position away from the frame.

17. The rear legs of claim 15, further comprising:

a release button, the release button located near the top end of the legs, the release button for releasing the rear legs from a first position nearly parallel to the frame to a second position away from the frame.

18. The first shelf of claim 15 wherein:

the first shelf is rotatable from a first position parallel to the pocket to a second position perpendicular to the pocket thereby providing a work surface.

19. The second shelf of claim 15 wherein:

the second shelf is rotatable from a first position parallel to the handle to a second position perpendicular to the handle thereby providing a work surface.

20. The sliding member of claim 15, further comprising:

the sliding member having release tabs, the release tabs when engaged allow the supports to translate relative to the horizontal member.

* * * * *